United States Patent
Henry et al.

(10) Patent No.: US 12,531,688 B2
(45) Date of Patent: Jan. 20, 2026

(54) DETERMINING LOCATION OF A BACKSCATTER DEVICE

(71) Applicant: Cisco Technology, Inc., San Jose, CA (US)

(72) Inventors: Jerome Henry, Pittsboro, NC (US); Robert E. Barton, Richmond (CA); Indermeet S. Gandhi, San Jose, CA (US)

(73) Assignee: Cisco Technology, Inc.

( * ) Notice: Subject to any disclaimer, the term of this patent is extended or adjusted under 35 U.S.C. 154(b) by 319 days.

(21) Appl. No.: 18/463,528

(22) Filed: Sep. 8, 2023

(65) Prior Publication Data

US 2024/0380539 A1    Nov. 14, 2024

Related U.S. Application Data

(60) Provisional application No. 63/501,777, filed on May 12, 2023.

(51) Int. Cl.
*H04L 5/00* (2006.01)
*H04W 52/04* (2009.01)

(52) U.S. Cl.
CPC ........... *H04L 5/0048* (2013.01); *H04W 52/04* (2013.01)

(58) Field of Classification Search
CPC ............................. H04W 52/04; H04L 5/0048
See application file for complete search history.

(56) References Cited

U.S. PATENT DOCUMENTS

| 2017/0086024 A1 | 3/2017 | Do |
| 2020/0169318 A1 | 5/2020 | Kim et al. |
| 2021/0396865 A1* | 12/2021 | Lockie ................. G01S 13/003 |
| 2023/0074373 A1 | 3/2023 | Jatunov et al. |
| 2023/0176207 A1 | 6/2023 | Kimionis et al. |

FOREIGN PATENT DOCUMENTS

| CN | 114720937 A | 7/2022 |
| KR | 20180020086 A | 2/2018 |
| WO | 2022117950 A1 | 6/2022 |
| WO | 2022170267 A1 | 8/2022 |

OTHER PUBLICATIONS

International Search Report and Written Opinion for International Application No. PCT/US2024/028681, mailed Sep. 6, 2024, 16 Pages.

* cited by examiner

*Primary Examiner* — Gbemileke J Onamuti
(74) *Attorney, Agent, or Firm* — Merchant & Gould P.C.

(57) ABSTRACT

Determining location of a Backscatter Devices (BKD) may be provided. A first quadrant of the first AP where the BKD is potentially located based on a first signal level, a second signal level, and a third signal level. A second quadrant of a second AP where the BKD is potentially located may be determined. A third quadrant of a third AP where the BKD is potentially located may be determined. A location of the BKD may be determined at an intersection of the first quadrant, the second quadrant, and the third quadrant.

20 Claims, 7 Drawing Sheets

DETERMINING LOCATION OF A BACKSCATTER DEVICE

RELATED APPLICATION

Under provisions of 35 U.S.C. § 119(e), Applicant claims the benefit of U.S. Provisional Application No. 63/501,777, filed May 12, 2023, which is incorporated herein by reference.

TECHNICAL FIELD

The present disclosure relates generally to determining location of a Backscatter Device (BKD).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Determining location of a Backscatter Device (BKD) may be provided. A first Access Point (AP) may be caused to transmit first charging frames from a first radio chain of the first AP. A first signal level of first BKD frames backscattered by a BKD in response to the first charging frames may be received. The first AP may be caused to transmit second charging frames from a second radio chain of the first AP. A second signal level of second BKD frames backscattered by the BKD in response to the second charging frames may be received. The first AP may be caused to transmit third charging frames from a third radio chain of the first AP. A third signal level of third BKD backscatter frames backscattered by the BKD in response to the third charging frames may be received. A first quadrant of the first AP where the BKD is potentially located based on the first signal level, the second signal level, and the third signal level. A second quadrant of a second AP where the BKD is potentially located may be determined. A third quadrant of a third AP where the BKD is potentially located may be determined. A location of the BKD may be determined at an intersection of the first quadrant, the second quadrant, and the third quadrant.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Ambient Power (AMP) Backscatter Devices (BKDs) may use ambient energy, for example, Radio Frequency (RF) signals to transmit data without a power source such as a battery or a connection to electricity. BKDs may use an antenna to receive the RF signals, use the RF signals for excitation (e.g., convert the RF signal into electricity), and use the power to modify and reflect the RF signals with data. Other devices may receive reflected RF signals transmitted by a BKD to process the data the BKD is sending. BKD operations may be described in documents and standards from the Institute of Electrical and Electronics Engineers (IEEE).

There may be two types of BKDs: passive BKDs (pBKDs) and active BKDs (pBKDs). A pBKD may directly reflect back the energy it receives. For example, A pBKD may embed or merge its response in received charging frames. An aBKD may include a capacitor and may thus charge until it sends its own frame. As discussed above, BKDs may be powered by ambient energy (for example, RF signals) present in the surrounding environment. In the IEEE 802.11, an AMP group may be working on mechanism for BKDs to co-exist with Wireless Fidelity (WiFi) devices in sub-1 GHz and 2.4 GHz bands. BKDs may have very different transmit and receive characteristics compared to WiFi devices. These characteristics may have consequences in the co-existence and placement of BKDs in a cell. For example, an Access Point (AP) or a WiFi management entity may need to know location of the BKDs to better allocate resources for sending charging frames or relaying BKD frames backscattered by BKDs in response to the charging frames. The disclosure may provide processes determining location of a BKD.

Figure 1:
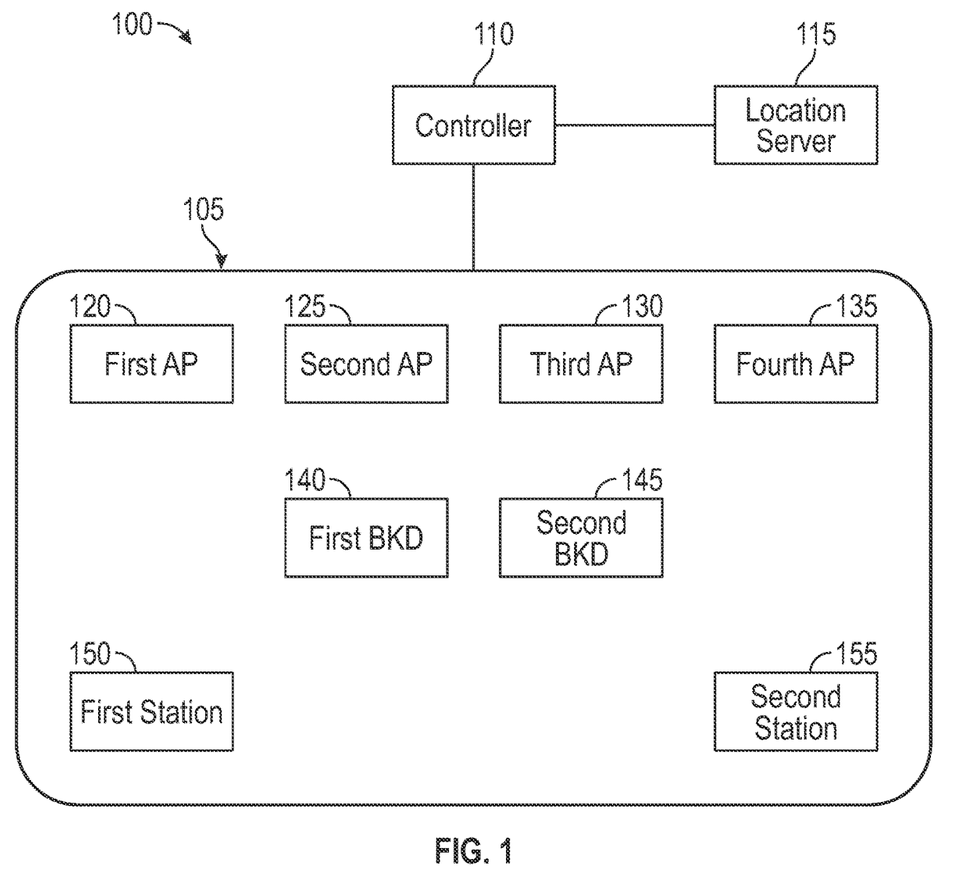
FIG. 1 is a block diagram of an operating environment for determining location of a Backscatter Devices (BKD)

FIG. 1 is a block diagram of an operating environment 100 for determining location of a BKD. Operating environment 100 may include a network 105, a controller 110 and a location server 115. Network 105 may include a plurality of network devices, for example, a plurality of Access Points (APs) (that is, a first AP 120, a second AP 125, a third AP 130, and a fourth AP 135), a plurality of BKDs (that is, a first BKD 140 and a second BKD 145), and a plurality of stations (that is, a first station 150 and a second station 155). Network 105 may comprise, but is not limited to, a Wireless Local Area Network (WLAN). Network 105 may also be referred to as a coverage environment.

Controller 110 may be a WLAN controller (WLC) and may provision and control network 105. Controller 110 may be implemented by a Digital Network Architecture Center (DNAC) controller (i.e., a Software-Defined Network (SDN) controller). Controller 110, first AP 120, second AP 125, third AP 130, and fourth AP 135 may provide a WLAN. Through this WLAN, first BKD 140, second BKD 145, first station 150, and second station 155 may be provided with access to the Internet or other cloud-based networking environments.

Location server 115 may determine location of the plurality of network devices of network 105. Each first AP 120, second AP 125, third AP 130, and fourth AP 135 may be compatible with specification standards such as, but not limited to, the Institute of Electrical and Electronics Engineers (IEEE) 802.11 specification standard for example. First AP 120, second AP 125, third AP 130, and fourth AP 135 may communicate with each other to conduct operations in concert. In addition, first AP 120, second AP 125, third AP 130, and fourth AP 135 may be devices that can send and receive signals to provide a connection to network 105.

First BKD 140 and second BKD 145 may be devices that can utilize RF signals that first AP 120 second AP 125, third AP 130, fourth AP 135, first station 150, and second station 155, and/or other devices transmit to generate power, modulate or otherwise modify the received signals to encode data, and backscatter the modulated signals. First BKD 140 and second BKD 145 may be user devices, Internet-of-Things (IoT) devices, sensors, and/or the like. Each of first BKD 140 and second BKD 145 may be a pBKD or an aBKD.

First station 150 and second station 155 may communicate with first AP 120, second AP 125, third AP 130, fourth AP 135, first BKD 140, and second BKD 145. First station 150 and second station 155 may be devices with a constant power source, for example, a battery or connected to electrical power. First station 150 and second station 155 may be, for example, a smart phone, a personal computer, a tablet device, a mobile device, a telephone, a remote control device, a set-top box, a digital video recorder, an IoT device, a network computer, a sensor, a router, an Automated Transfer Vehicle (ATV), a drone, an Unmanned Aerial Vehicle (UAV), or other similar microcomputer-based device.

The elements described above of operating environment 100 (e.g., controller 110, location server 115, first AP 120, second AP 125, third AP 130, fourth AP 135, first BKD 140, second BKD 145, first station 150, and second station 155) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 100 may be practiced in a computing device 600.

Figure 2:
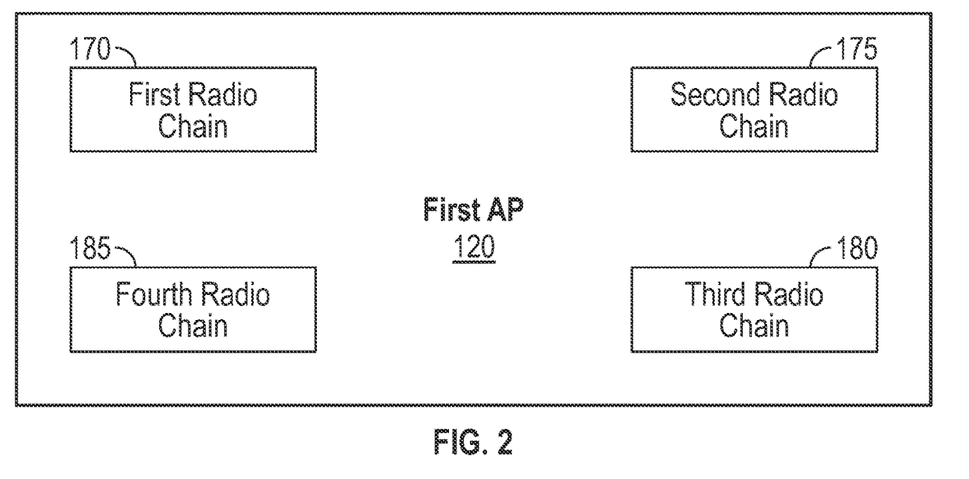
FIG. 2 is a block diagram of an Access Point (AP)

FIG. 2 is a block diagram of first AP 120. As shown in FIG. 2, first AP 120 may include a first radio chain 170, a second radio chain 175, a third radio chain 180, and a fourth radio chain 185. Each of first radio chain 170, second radio chain 175, third radio chain 180, and a fourth radio chain 185 may be oriented in different directions around first AP 120 with respect to a central axis of first AP 120. For example, first radio chain 170 may be oriented in a first direction, second radio chain 175 may be oriented in a second direction, third radio chain 180 may be oriented in a third direction, and fourth radio chain 185 may be oriented in a fourth direction. First AP 120 may include more than 4 radio chains. For example, First AP 120 may include, 8, 16, or 32 radio chains each oriented in a different direction.

Figure 3:
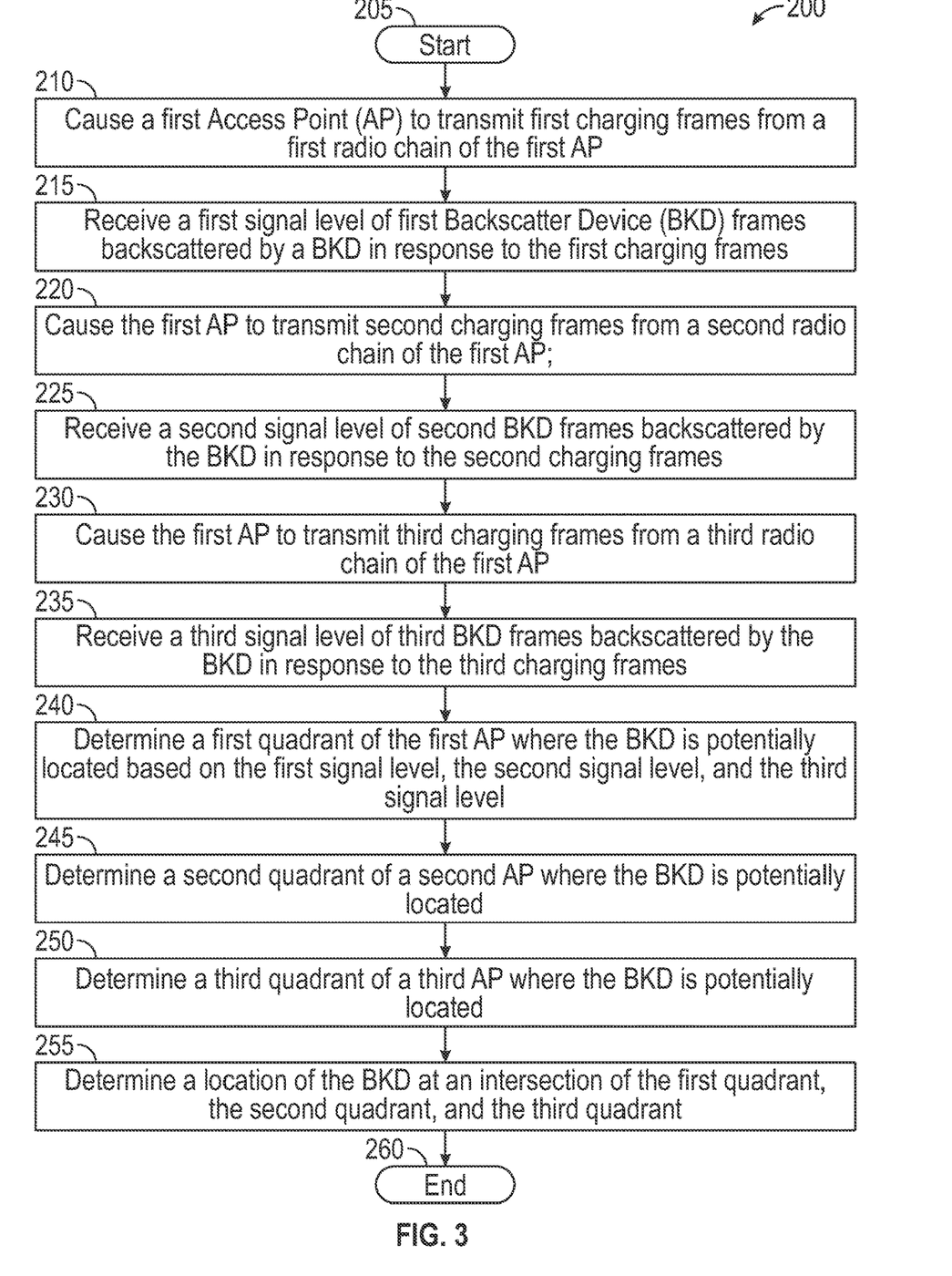
FIG. 3 is a flow chart of a first method for determining location of a BKD.

FIG. 3 is a flow chart setting forth the general stages involved in a first method 200 consistent with embodiments of the disclosure for determining location of a BKD, for example, first BKD 140. Method 200 may be implemented using location server 115 as described in more detail above with respect to FIG. 1. However, method 200 may be implemented using any of controller 110, first AP 120, second AP 125, third AP 130, fourth AP 135, first station 150, and second station 155 as described in more detail above with respect to FIG. 1. Ways to implement the stages of method 200 will be described in greater detail below.

Method 200 may begin at starting block 205 and proceed to stage 210 where location server 115 may cause first AP 120 to transmit first charging frames from first radio chain 170 of first AP 120. Location server 115, for example, may send trigger frames to first AP 120 that may cause first AP 120 to transmit the first charging frames. The first charging frames may be transmitted in a first direction over a target detection channel. First BKD 140 may backscatter first BKD frames in response to the first charging frames. A pBKD may backscatter in real time while an aBKD may backscatter after charging a capacitor.

After causing first AP 120 to transmit the first charging frames from first radio chain 170 at stage 210, method 200 may proceed to stage 215 where location server 115 may receive a first signal level of the first BKD frames backscattered by first BKD 140 in response to the first charging frames. First station 150, for example, may detect the first BKD frames backscattered by first BKD 140 and may determine the first signal level at which the first BKD frames were detected at first station 150. First station 150 then may send the first signal level to location server 115. In some examples, first station 150 may send the first signal level to first AP 120 or controller 110 which in turn may send it to location server 115.

First station 150, in some other examples, may demodulate the first BKD frames, insert the demodulated first BKD frames into a data frame, and send the data frame comprising the demodulated BKD frames to first AP 120, controller 110, or location server 115. The data frame that may include the demodulated BKD frames and may be sent over a target relay channel using IEEE 802.11 mechanisms. The data frame may have a predetermined format indicating that it may contain BKD frames. In such examples, the data frame may be of a non-data type, for example, a management frame or an action frame. The data frame may indicate a signal level (for example, a RSSI value) at which first station 150 detected first BKD frames. The signal level may be indicated in an Information Element (IE) in a header of the data frame or the relayed BKD frame. The IE may also include other operational parameters, for example, a number of BKD frames that were detected. The first signal level may be determined from the IE of the data frame.

The first signal level for the first BKD frames may be several orders of magnitude lower than a signal level of the first charging frames received at first BKD 140. The signal level of the first charging frames may be subject to a path loss between first AP 120 and first BKD 140. The path loss may depend on obstructions, reflections, etc. in a signal path. The signal level of the charging frames when received by first BKD 140, and thus, the first signal level of the first BKD frames backscattered by first BKD 140 may, therefore, depend on a distance and an orientation of first BKD 140 relative to first AP 120.

Once having received the first signal level of the first BKD frames backscattered by first BKD 140 in response to the first charging frames at stage 220, method 200 may proceed to stage 230 where location server 115 may cause first AP 120 to transmit second charging frames from second radio chain 175 of first AP 120. The second charging frames may be transmitted in a second direction over the target detection channel. The second direction may be different from the first direction. First BKD 140 may backscatter second BKD frames in response to the second charging frames.

After causing first AP 120 to transmit the second charging frames from second radio chain 175 at stage 220, method 200 may proceed to stage 225 where location server 115 may receive a second signal level of the second BKD frames backscattered by first BKD 140 in response to the second charging frames. The second signal level may be provided by first station 150 in response to detecting the second BKD frames at first station 150. The second signal level may be different than the first signal level as the path losses for the second charging frames may be different than that of the first charging frames between first AP 120 and first station 150 as the second charging frames may be transmitted in a different direction than the first charging frames. The second charging frames, for example, may pass through different obstacles and different number and angles of reflections before reaching first BKD 140 compared to the first charging frames. Hence, the signal level of the second charging frames when received at first BKD 140 may be different than the signal level of the first charging frames. As a result, the second signal level of the second BKD frames backscattered in response to the second charging frames may be different from the first signal level of the first BKD frames backscattered in response to the first charging frames.

Once having received the second signal level of the second BKD frames backscattered by first BKD 140 in response to the second charging frames at stage 225, method 200 may proceed to stage 230 where location server 115 may cause first AP 120 to transmit third charging frames from third radio chain 180 of first AP 120. The third charging frames may be transmitted in a third direction over the target detection channel. The third direction may be different from each of the first direction and the second direction. First BKD 140 may backscatter third BKD frames in response to the third charging frames.

After causing first AP 120 to transmit the third charging frames from third radio chain 180 at stage 230, method 200 may proceed to stage 235 where location server 115 may receive a third signal level of the third BKD frames backscattered by first BKD 140 in response to the third charging frames. The third signal level may be provided by first station 150 in response to detecting the third BKD frames at first station 150. The third signal level may be different than each of the first signal level and the second signal level as the path losses for the third charging frames may be different than each of the first charging frames and the second charging frames between first AP 120 and first station 150 as the third charging frames may be transmitted in a different direction from each of the first charging frames and the second charging frames. The third charging frames, for example, may pass through different obstacles and different number and angles of reflections before reaching first BKD 140 compared to each of the first charging frames and the second charging frames. Hence, the signal level of the third charging frames may be different than the signal level of each of the first charging frames and the second charging frames when received at first BKD 140. As a result, the third signal level of the third BKD frames backscattered in response to the third charging frames may be different from both the first signal level of the first BKD frames and the second signal level of the second BKD frames.

In addition, location server 115 may cause first AP 120 to transmit fourth charging frames from fourth radio chain 185 of first AP 120. The fourth charging frames may be transmitted in a fourth direction over the target detection channel. The fourth direction may be different from each of the first direction, the second direction, and the third direction. First BKD 140 may backscatter fourth BKD frames in response to the fourth charging frames. First station 150 may detect the fourth BKD frames and determine a fourth signal level of the fourth BKD frames. First station may provide the fourth signal level to location server 115 or controller 110. The fourth signal level may be different than each of the first signal level of the first BKD frames, the second signal level of the second BKD frames, and the third signal level of the third BKD frames.

Once having received the third signal level of the third BKD frames backscattered by first BKD 140 in response to the third charging frames at stage 235, method 200 may proceed to stage 240 where location server 115 may determine a first quadrant of first AP 120 where first BKD 140 may potentially be located based on the first signal level, the second signal level, and the third signal level. For example, an orientation of each of the first radio chain, the second radio chain, and the third radio chain in first AP 120 may be determined. A highest signal level of the first signal level, the second signal level, and the third signal level may be determined. A quadrant corresponding to the orientation of a radio chain of the first radio chain, the second radio chain, and the third radio chain associated with the highest signal level of the first signal level, the second signal level, and the third signal level may be determined as the first quadrant of first AP 120. In some examples, the first quadrant is determined based on the first signal level, the second signal level, the third signal level, and the fourth signal level. A different number of radio chains and hence signal levels may be used to determine the first quadrant.

After determining the first quadrant of first AP 120 where first BKD 140 may potentially be located at stage 240, method 200 may proceed to stage 245 where location server 115 may determine a second quadrant of second AP 125 where first BKD 140 may potentially be located. The second quadrant of second AP 125 where first BKD 140 may potentially be located may be determined by repeating stages 210 to 240 using second AP 125.

Once having determined the second quadrant of second AP 125 where first BKD 140 may potentially be located at stage 245, method 200 may proceed to stage 250 where location server 115 may determine a third quadrant of third AP 130 where first BKD 140 may potentially be located. The third quadrant of third AP 130 where first BKD 140 may potentially be located may be determined by repeating stages 210 to 240 using third AP 130. In some examples, location server 115 may determine a fourth quadrant of fourth AP 135 where first BKD 140 may potentially be located, and so on. In some other examples, only two quadrants from two APs may be determined.

After determining the third quadrant of third AP 130 where first BKD 140 may potentially be located at stage 250, method 200 may proceed to stage 255 where location server 115 may determine location of first BKD 140 at an intersection of the first quadrant, the second quadrant, and the third quadrant. In some examples, location server 115 may determine the location of first BKD 140 at an intersection of the first quadrant, the second quadrant, the third quadrant, and the fourth quadrant. In some other examples, location server 115 may determine the location of first BKD 140 at an intersection of the first quadrant and the second quadrant. After determining the location of first BKD 140 as an intersection of the first quadrant, the second quadrant, and the third quadrant at stage 255, method 200 may end at stage 260.

Figure 4:
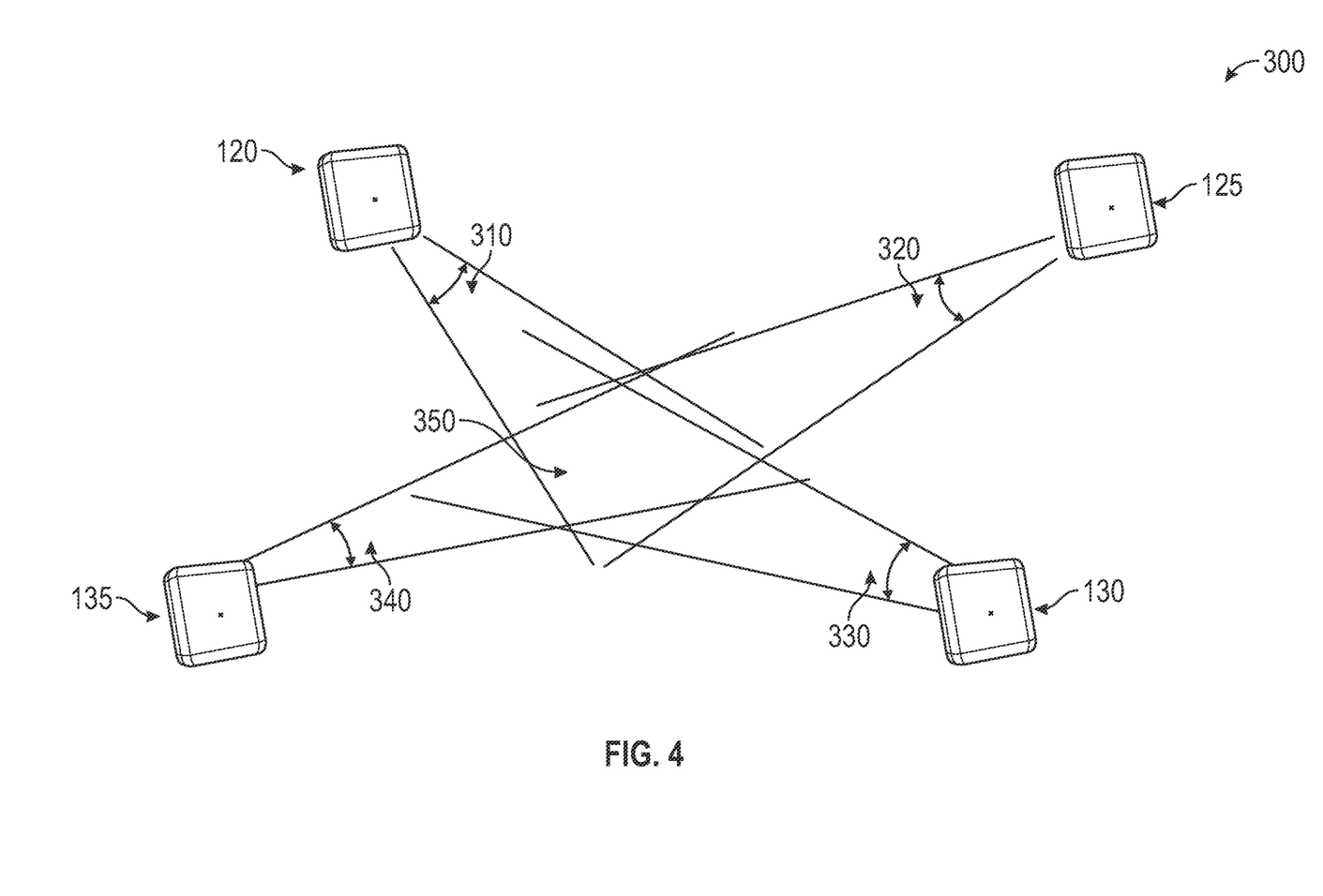
FIG. 4 is a diagram of location quadrants of Access Points (APs)

FIG. 4 is a diagram 300 illustrating quadrants of APs. For example, FIG. 4 illustrates a first quadrant 310 of first AP 120, a second quadrant 320 of second AP 125, a third quadrant 330 of third AP 130, a fourth quadrant 340 of fourth AP 135. The location of first BKD 140 at an intersection 350 of first quadrant 310, second quadrant 320, third quadrant 330, and fourth quadrant 340. The location of first BKD 140 may be determined as in an area indicated by intersection 350 rather than a specific location.

In accordance with example embodiments, the charging frames may be transmitted by first station 150 and the BKD frames backscattered by first BKD 140 may be detected by each of first AP 120, second AP 125, third AP 130, and fourth AP 135. The location of first BKD 140 may be determined based on signal levels of the BKD frames detected at first AP 120, second AP 125, third AP 130, and fourth AP 135, or at each radio chains of each of first AP 120, second AP 125, third AP 130, and fourth AP 135.

Figure 5:
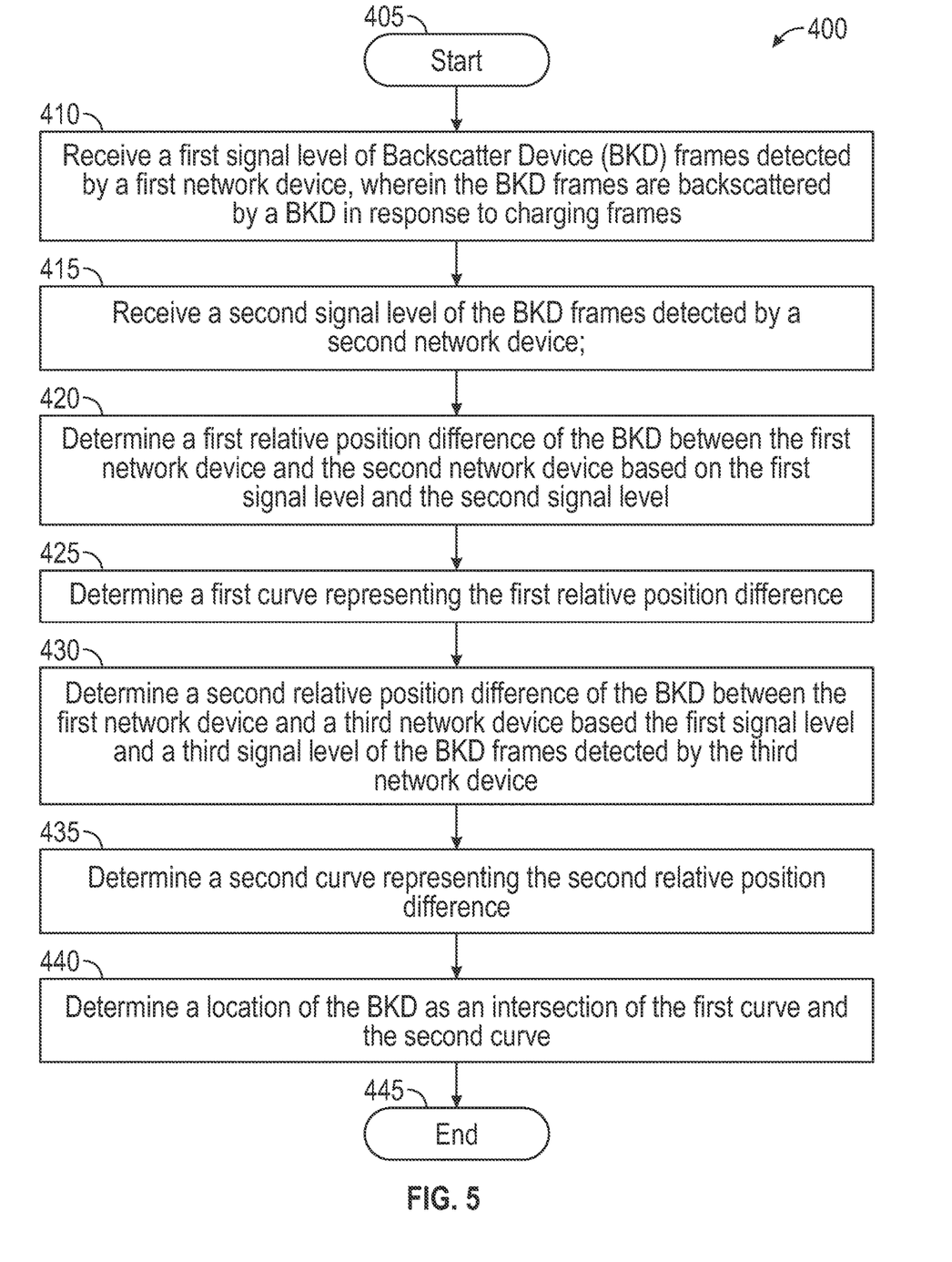
FIG. 5 is a flow chart of a second method for determining location of a BKD.

FIG. 5 is a flow chart setting forth the general stages involved in a second method 400 consistent with embodiments of the disclosure for determining location of a BKD, for example, first BKD 140. Method 400 may be implemented using location server 115 as described in more detail above with respect to FIG. 1. However, method 400 may be implemented using any of controller 110, first AP 120, second AP 125, third AP 130, fourth AP 135, first station 150, and second station 155 as described in more detail above with respect to FIG. 1. Ways to implement the stages of method 400 will be described in greater detail below.

Method 400 may begin at starting block 405 and proceed to stage 410 where location server 115 may receive a first signal level of BKD frames detected by a first network device, for example, first station 150. The BKD frames are backscattered by first BKD 140 in response to charging frames. The charging frames may be transmitted by first AP 120. Location server 115 may cause first AP 120 to transmit the charging frames. First BKD 140 may backscatter the BKD frames in response to the charging frames.

First station 150 may determine the first signal level at which the BKD frames were detected by first station 150. First station 150 then send the first signal level to location server 115. First station 150 may send the first signal level to first AP 120 or controller 110 which in turn may send it to location server 115. First station 150, in some other examples, may send the first signal level in a data frame along with the BKD frames.

After receiving the first signal level of the BKD frames detected by first station 150 at stage 410, method 400 may proceed to stage 420 where location server 115 may receive a second signal level of the BKD frames detected by a second network device, for example, second AP 125. Second AP 125 may determine the second signal level at which the BKD frames were detected by second AP 125. Second AP 125 then may send the second signal level to location server 115. Second AP 125 may send the second signal level to first AP 120 or controller 110 which in turn may send it to location server 115. Second AP 125, in some examples, may send the second signal level in data frames comprising the BKD frames.

Once having received the second signal level of the BKD frames detected by second AP 125 at stage 415, method 400 may proceed to stage 420 where location server 115 may determine a first relative position difference of the BKD between the first network device and the second network device based on the first signal level and the second signal level. For example, if the first signal level received from first station 150 is two times of the second signal level received from second AP 125, then location server 115 may determine that first BKD 140 is two times closer to first station 150 than second AP 125.

After determining the first relative position difference at stage 420, method 400 may proceed to stage 425 where location server 115 may determine a first curve representing the first relative position difference. For example, each point on the first curve may represent the first relative position difference of first BKD 140 with respect to first station 150 and second AP 125. In some examples, the first curve may be a hyperbola.

Once having determined the first curve representing the first relative position difference at stage 425, method 400 may proceed to stage 430 where location server 115 may determine a second relative position difference of first BKD 140 between the first network device (that is, first station 150) and a third network device (for example, third AP 130) based the first signal level and a third signal level of the BKD frames detected by the third network device (that is, third AP 130). Third AP 130 may determine the third signal level at which the BKD frames were detected by third AP 130. Third AP 130 then may send the third signal level to location server 115. Third AP 130 may send the third signal level to first AP 120 or controller 110 which in turn may send it to location server 115. Third AP 130, in some examples, may send the third signal level in data frames comprising the BKD frames.

Location server 115 may determine the second relative position difference of first BKD 140 between first station 150 and third AP 130 based on the first signal level and the third signal level. For example, if the first signal level received from first station 150 is three times of the third signal level received from third AP 130, then location server 115 may determine that first BKD 140 is three times closer to first station 150 compared to third AP 130.

After determining the second relative position difference at stage 430, method 400 may proceed to stage 435 where location server 115 may determine a second curve representing the second relative position difference. Each point on the second curve may represent the second relative position difference of first BKD 140 with respect to first station 150 and third AP 130. In some examples, the second curve may also be a hyperbola.

In some examples, location server 115 may determine a third relative position difference between first station 150 and a fourth network device (for example, fourth AP 135) based the first signal level and a fourth signal level of the BKD frames detected by the fourth network device (that is, fourth AP 135). Location server 115 may determine a third curve representing the third relative position difference.

Once having determined the second curve representing the second relative position difference at stage 435, method 400 may proceed to stage 440 where location server 115 may determine the location of first BKD 140 as an intersection of the first curve and the second curve. Since, the location of second AP 125, third AP 130, and first station 150 may be known, the location of the intersection of the first curve and the second curve may be determined from the known locations of second AP 125, third AP 130, and first station 150. In some examples, location server 115 may determine the location of first BKD 140 at the intersection of the first curve, the second curve, and the third curve. After determining the location of first BKD 140 at the intersection of the first curve and the second curve at stage 440, method 400 may end at stage 445. In some examples, location server 115 may use more than 3 curves to determine the location of first BKD 140.

Figure 6:
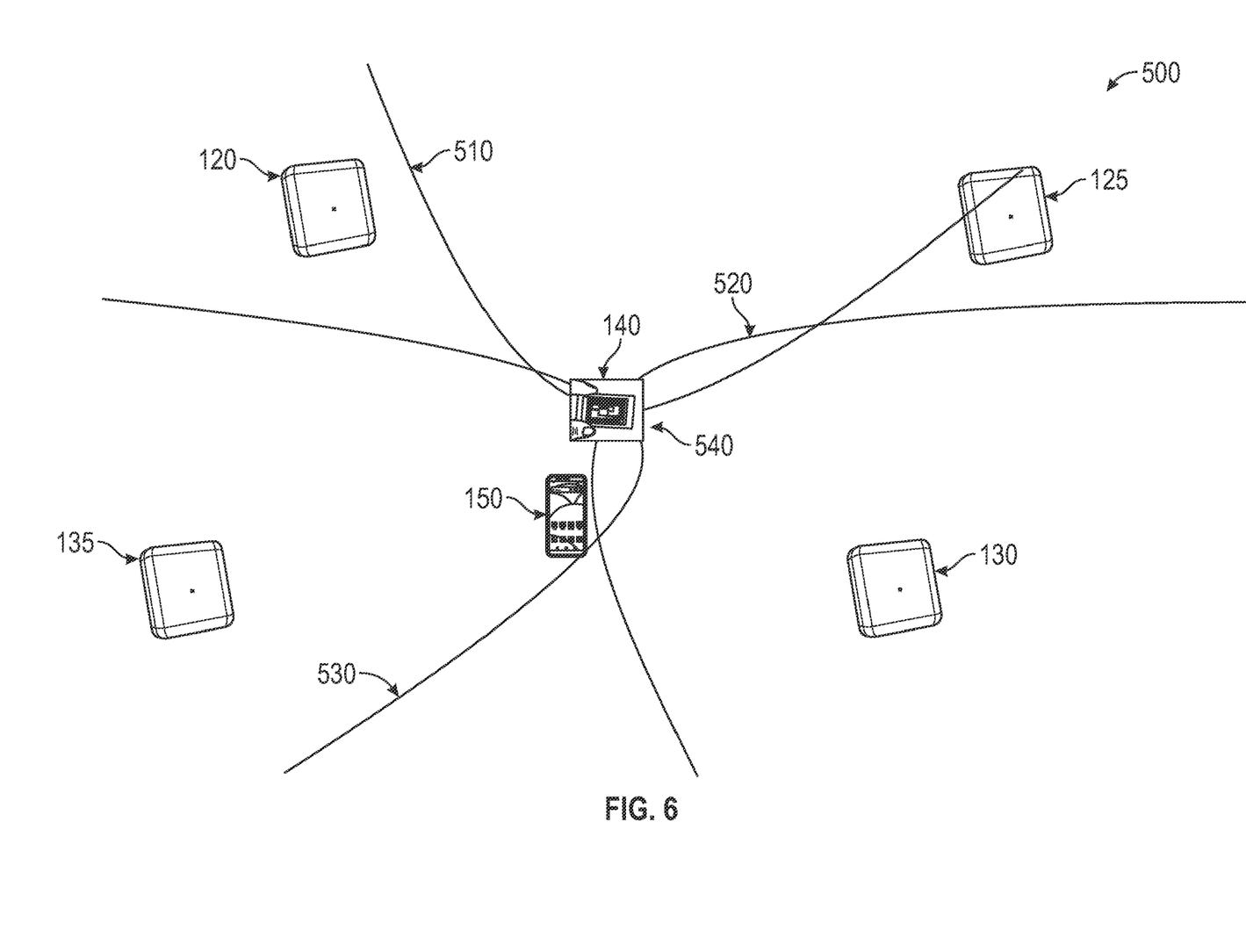
FIG. 6 is a diagram of first location curves representing relative positions of a BKD.

FIG. 6 is a diagram 500 illustrating first location curves representing the relative position differences. For example, FIG. 6 illustrates a first curve 510 representing the first relative position difference of first BKD 140 between first station 150 and second AP 125, a second curve 520 representing the second relative position difference of first BKD 140 between first station 150 and third AP 130, and a third curve 530 representing the third relative positions difference of first BKD 140 between first station 150 and fourth AP 135. The location of first BKD 140 may be at an intersection 540 of first curve 510, second curve 520, and third curve 530. The location of the intersection 540 may be determined from known locations of second AP 125, third AP 130, fourth AP 135, and first station 150.

Figure 7:
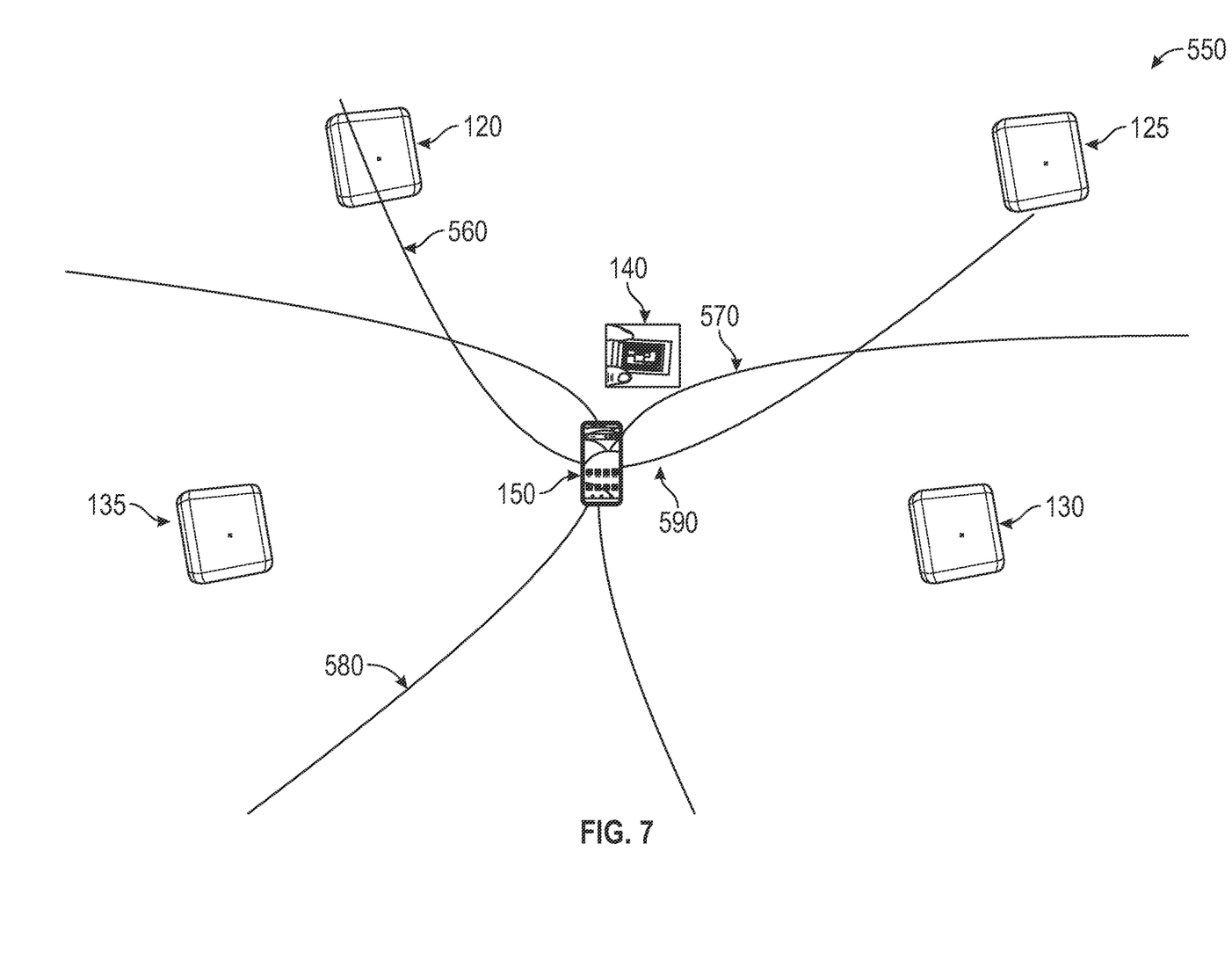
FIG. 7 is a diagram of second location curves representing relative positions of a station.

In some examples, the location of first BKD 140 may be known. In such examples, method 400 may be used to determine the location of first station 150 using the known location of first BKD 140. FIG. 7 is a diagram 550 illustrating second location curves of representing the relative position differences for first station 150. For example, FIG. 7 illustrates a fourth curve 560 representing the fourth relative position difference of first station 150 between first BKD 140 and second AP 125, a fifth curve 570 representing the second relative position difference of first station 150 between first BKD 140 and third AP 130, and a sixth curve 570 representing the third relative position difference of first station 150 between first BKD 140 and fourth AP 135. The location of first station 150 may be at an intersection 590 of fourth curve 560, fifth curve 570, and sixth curve 580. The location of the intersection 590 may be determined from known locations of second AP 125, third AP 130, fourth AP 135, and first BKD 140.

In processes disclosed herein, a transmit source may be known as the transmit source may be one of first AP 120, second AP 125, third AP 130, and fourth AP 135. Thus, a transmit power and antenna characteristics of the transmit source may be known. As a result, the signal levels of received signals (that is, charging frames and BKD frames) may be a direct function of a distance adjusted to environment noise. Even when first station 150 is used as a transmitting source (where the transmit power and antenna characteristics may not be known), location server 115 may compare BKD frames received on each of the plurality of APs in response to the charging frames transmitted by first station 150 at similar power in all cases and with a same antenna and the intensity.

An accuracy of the location found may be a function of a transmission bandwidth and number of contributing APs. However, it may not be a function of a bandwidth of BKDs. Therefore, the location of a BKD transmitting over a narrow band (e.g. 20 MHZ) may be determined with a same approximate accuracy as the location of a station (or an AP) transmitting over a wider band (e.g. 160 MHZ).

In one embodiment, first station 150 may support Fine Time Measurement (FTM). APs may use the FTM to add to the hyperbolic location, ranging information (thus complementing hyperbolic trilateration with circular trilateration), thereby increasing an accuracy of the location of first station 150. As the location of first BKD 140 may be comparative to that of first station 150, using the FTM may in turn increases the accuracy of the location of first BKD 140 determined using method 200 and method 400.

In some examples, first station 150 may be mobile. As first station 150 moves, location server 115 may trigger the plurality of APs to initiate FTM exchanges with first station 150. As first station 150 performs ranging and moves along a displacement vector, location server 115 may predict a next position of first station 150 and may use that prediction to correct the value of the FTM measurements with first station 150 (for example, using Kalman filters, or wavelets, etc.). Between FTM exchanges, first station may also send charging frames. Location server 115 may use the same correction factor, to correct the position of first BKD 140, for example, by comparing the predicted scattered value to the measured value. Such correction may allow further refining the location of first BKD 140.

In another examples, first BKD 140 location may be known, but the location of a mobile first station 150, supporting the FTM and charging frames, may not be known. Location server 115 may use the known location of first BKD 140 (and the expected signal level on each of the plurality of APs, compared to the observed signal level) to correct the observed signal for noise. Location server 115 may use the same correction factor to refine the range obtained from the FTM exchanges, and thus determines the location of first station 150 with a higher accuracy.

In some example embodiments, a measuring AP may observe a variation of signal levels of BKD frames backscattered in response to a mobile station sending charging frames. Using the FTM, the AP may then determine a range of the mobile station when it is closest to first BKD 140 (highest signal level of the BKD frames). By proceeding this way from different APs and with different stations, location server may build a location probability zone for first BKD 140.

Figure 8:
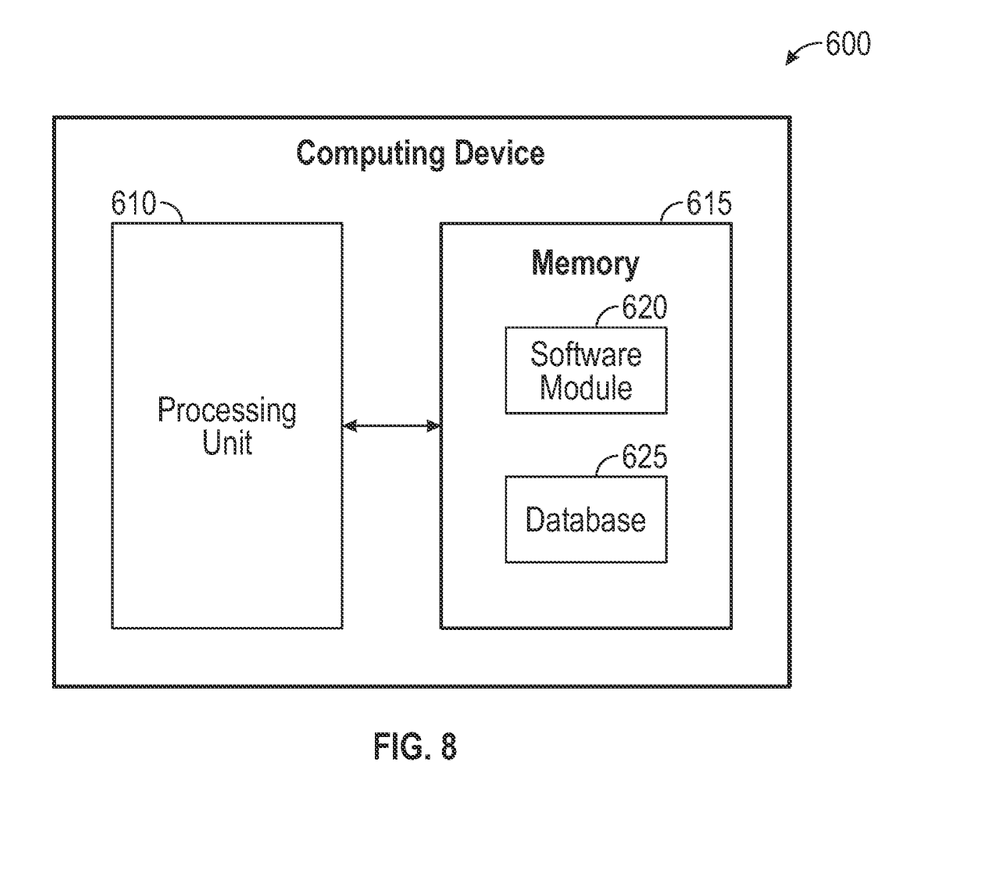
FIG. 8 is a block diagram of a computing device.

FIG. 8 is a block diagram of a computing device 600. As shown in FIG. 8, computing device 600 may include a processing unit 610 and a memory unit 615. Memory unit 615 may include a software module 620 and a database 625.

While executing on processing unit 610, software module 620 may perform, for example, processes for determining location of a BKD described with respect to FIG. 3 and FIG. 5. Computing device 600, for example, may provide an operating environment for controller 110, location server 115, first AP 120, second AP 125, third AP 130, fourth AP 135, first BKD 140, second BKD 145, first station 150, and second station 155, and the like. Controller 110, location server 115, first AP 120, second AP 125, third AP 130, fourth AP 135, first BKD 140, second BKD 145, first station 150, and second station 155, and the like may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   causing a first Access Point (AP) to transmit first charging frames from a first radio chain of the first AP;
   receiving a first signal level of first Backscatter Device (BKD) frames backscattered by a BKD in response to the first charging frames;
   causing the first AP to transmit second charging frames from a second radio chain of the first AP;

receiving a second signal level of second BKD frames backscattered by the BKD in response to the second charging frames;
causing the first AP to transmit third charging frames from a third radio chain of the first AP;
receiving a third signal level of third BKD backscatter frames backscattered by the BKD in response to the third charging frames;
determining a first quadrant of the first AP where the BKD is potentially located based on the first signal level, the second signal level, and the third signal level;
determining a second quadrant of a second AP where the BKD is potentially located;
determining a third quadrant of a third AP where the BKD is potentially located; and
determining a location of the BKD at an intersection of the first quadrant, the second quadrant, and the third quadrant.

2. The method of claim 1, wherein determining the first quadrant of the first AP where the BKD is potentially located further comprises:
causing the first AP to transmit fourth charging frames from a fourth radio chain of the first AP;
receiving a fourth signal level of fourth BKD frames backscattered by the BKD in response to the fourth charging frames; and
determining the first quadrant of the first AP where the BKD is potentially located based on the first signal level, the second signal level, the third signal level, and the fourth signal level.

3. The method of claim 1, wherein determining the location of the BKD further comprises:
determining a fourth quadrant of a fourth AP where the BKD is potentially located; and
determining the location of the BKD at an intersection of the first quadrant, the second quadrant, the third quadrant, and the fourth quadrant.

4. The method of claim 1, wherein determining the first quadrant of the first AP where the BKD is potentially located based on the first signal level, the second signal level, and the third signal level further comprises:
determining an orientation of each of the first radio chain, the second radio chain, and the third radio chain in the first AP;
determining a highest signal level of the first signal level, the second signal level, and the third signal level; and
determining a quadrant corresponding to the orientation of a radio chain of the first radio chain, the second radio chain, and the third radio chain associated with the highest signal level of the first signal level, the second signal level, and the third signal level.

5. The method of claim 1, wherein each of the first radio chain, the second radio chain, and the third radio chain of the first AP are oriented in different directions.

6. The method of claim 1, wherein each of the first charging frames, the second charging frames, and the third charging frames are transmitted in different directions.

7. The method of claim 1, wherein the BKD is one of the following: an active BKD and a passive BKD.

8. A method comprising:
receiving a first signal level of Backscatter Device (BKD) frames detected by a first network device, wherein the first BKD frames are backscattered by a BKD in response to first charging frames;
receiving a second signal level of the BKD frames detected by a second network device;
determining a first relative position difference of the BKD between the first network device and the second network device based on the first signal level and the second signal level;
determining a first curve representing the first relative position difference;
determining a second relative position difference of the BKD between the first network device and a third network device based the first signal level and a third signal level of the BKD frames detected by the third network device;
determining a second curve representing the second relative position difference; and
determining a location of the BKD as an intersection of the first curve and the second curve.

9. The method of claim 8, further comprising:
determining a third relative position difference between the first network device and a fourth network device from the BKD based the first signal level and a fourth signal level of the BKD frames detected by the fourth network device;
determining a third curve representing the third relative position difference; and
determining the location of the BKD as the intersection of the first curve, the second curve and the third curve.

10. The method of claim 8, wherein the first network device is a station comprising one of the following: a smart phone, a tablet, an Internet of Things (IoT) device, and an Access Point (AP).

11. The method of claim 8, further comprising:
determining a location of the first network device using Fine Time Measurement (FTM); and
determining the location of the BKD further based on the location of the first network device.

12. The method of claim 8, further comprising:
determining a location of the first network device from a known location of the BKD.

13. The method of claim 8, wherein the BKD is one of the following: an active BKD and a passive BKD.

14. The method of claim 8, further comprising:
transmitting the charging frames, wherein the charging frames are transmitted by an Access Point (AP).

15. A system comprising:
a memory storage; and
a processing unit coupled to the memory storage, wherein the processing unit is operative to:
determine a first quadrant of a first Access Point (AP) where a Backscatter Device (BKD) is potentially located, wherein the processing unit being operative to determine the first quadrant where the BKD is potentially located comprises the processing unit being operative to:
cause the first AP to transmit first charging frames from a first radio chain of the first AP;
receive a first signal level of first BKD frames backscattered by the BKD in response to the first charging frames;
cause the first AP to transmit second charging frames from a second radio chain of the first AP;
receive a second signal level of second BKD frames backscattered by the BKD in response to the second charging frames;
cause the first AP to transmit third charging frames from a third radio chain of the first AP;
receive a third signal level of third BKD frames backscattered by the BKD in response to the third charging frames; and determine the first quadrant of the first AP where the BKD is potentially located based on the first signal level, the second signal level, and the third signal level;

determine a second quadrant of a second AP where the BKD is potentially located;

determine a third quadrant of a third AP where the BKD is potentially located; and determine a location of the BKD at an intersection of the first quadrant, the second quadrant, and the third quadrant.

16. The system of claim 15, wherein the processing unit being operative to determine the first quadrant of the first AP where the BKD is potentially located further comprises the processing unit being operative to:

cause the first AP to transmit fourth charging frames from a fourth radio chain of the first AP;

receive a fourth signal level of fourth BKD frames backscattered by the BKD in response to the fourth charging frames; and determine the first quadrant of the first AP where the BKD is potentially located based on the first signal level, the second signal level, the third signal level, and the fourth signal level.

17. The system of claim 15, wherein the processing unit being operative to determine the first quadrant of the first AP where the BKD is potentially located based on the first signal level, the second signal level, and the third signal level further comprises the processing unit being operative to:

determine an orientation of each of the first radio chain, the second radio chain, and the third radio chain in the first AP;

determine a highest signal level of the first signal level, the second signal level, and the third signal level; and determine a quadrant corresponding to the orientation of a radio chain of the first radio chain, the second radio chain, and the third radio chain associated with the highest signal level of the first signal level, the second signal level, and the third signal level.

18. The system of claim 15, wherein each of the first radio chain, the second radio chain, and the third radio chain in the first AP are oriented in different directions.

19. The system of claim 15, wherein each of the first charging frames, the second charging frames, and the third charging frames are transmitted in different directions.

20. The system of claim 15, wherein the BKD is one of the following: an active BKD and a passive BKD.

\* \* \* \* \*